(12) United States Patent
Vincent

(10) Patent No.: US 11,951,045 B2
(45) Date of Patent: Apr. 9, 2024

(54) AIR CONDITIONING ASSEMBLY

(71) Applicant: SPORTING EDGE (UK) LIMITED, Basingstoke (GB)

(72) Inventor: David Vincent, Hants (GB)

(73) Assignee: Sporting Edge (UK) Limited, Basingstoke (GB)

( * ) Notice: Subject to any disclaimer, the term of this patent is extended or adjusted under 35 U.S.C. 154(b) by 1247 days.

(21) Appl. No.: 16/477,079

(22) PCT Filed: Jan. 11, 2018

(86) PCT No.: PCT/GB2018/000005
§ 371 (c)(1),
(2) Date: Jul. 10, 2019

(87) PCT Pub. No.: WO2018/130807
PCT Pub. Date: Jul. 19, 2018

(65) Prior Publication Data
US 2019/0328595 A1      Oct. 31, 2019

(30) Foreign Application Priority Data

Jan. 11, 2017 (GB) ...................................... 1700458

(51) Int. Cl.
*A61G 10/02* (2006.01)
(52) U.S. Cl.
CPC .......... *A61G 10/02* (2013.01); *A61G 2203/30* (2013.01); *A61G 2203/46* (2013.01)
(58) Field of Classification Search
CPC ...... A61G 10/02; A61G 10/005; A61G 10/04; A61G 10/026; F24F 8/60; F24F 9/00;
(Continued)

(56) References Cited

U.S. PATENT DOCUMENTS 3,511,162 A * 5/1970 Truhan ...................... F24F 9/00
454/189
5,799,652 A * 9/1998 Kotliar ................... B01D 53/04
482/13
(Continued)

FOREIGN PATENT DOCUMENTS

DE    102015120138 A1    6/2016
EP        0959862 A1    12/1999
(Continued)

*Primary Examiner* — Margaret M Luarca
(74) *Attorney, Agent, or Firm* — Christopher M. Ramsey; GrayRobinson, P.A.

(57) ABSTRACT

An air conditioning assembly for an environmental chamber includes a suspended ceiling below a structural ceiling creating a plenum space. The suspended ceiling is configured to cover a substantially horizontal plane of the environmental chamber while leaving a first perimeter gap adjacent to a wall of the environmental chamber and a second perimeter gap adjacent to an opposing wall of the environmental chamber. A substantially vertical wall covers a vertical plane of the plenum space. At least one fan draws air from one from the environmental chamber into the plenum space through the first perimeter gap and blows air from the plenum space into the environmental chamber through the second perimeter gap. At least one air conditioning means in fluid communication with the at least one fan conditions the air flow passing through the at least one fan. The air conditioning assembly creates substantially laminar air flow.

20 Claims, 3 Drawing Sheets

(58) Field of Classification Search
CPC ........ F24F 13/08; B64D 13/00; A61B 10/026;
A63B 2213/005; A63B 2213/006
See application file for complete search history.

(56) References Cited

U.S. PATENT DOCUMENTS

| | | | | |
|---|---|---|---|---|
| 6,565,624 | B2* | 5/2003 | Kutt | A63B 23/18 |
| | | | | 96/111 |
| 6,877,335 | B2* | 4/2005 | Triboix | F24F 7/10 |
| | | | | 62/418 |
| 8,523,644 | B2* | 9/2013 | Melles | A61B 90/40 |
| | | | | 454/187 |
| 2001/0003902 | A1 | 6/2001 | Kopko | |

FOREIGN PATENT DOCUMENTS

| | | | |
|---|---|---|---|
| GB | 664740 | A | 1/1952 |
| GB | 1362249 | A | 7/1974 |
| GB | 2378502 | A | 2/2003 |
| WO | 8802464 | A1 | 4/1988 |
| WO | 2016098598 | A1 | 6/2016 |

* cited by examiner

AIR CONDITIONING ASSEMBLY

CROSS-REFERENCE TO RELATED APPLICATIONS

This is the U.S. National Stage application of International Application No. PCT/GB2018/000005, filed Jan. 11, 2018, which claims the benefit of priority from GB Application No. 1700458.1, filed Jan. 11, 2017. Each of these prior applications is incorporated by reference in its entirety.

FIELD

This invention pertains generally to the field of air conditioning assemblies for environmental chambers, and in particular means of converting a room to form an environmental chamber.

BACKGROUND

Environmental chambers typically comprise an enclosed space within which specific environmental conditions can be controlled, varied and monitored. Test subjects are placed within the chamber, and their performance tracked when subjected to a change in conditions. The temperature and humidity of the air flow being blown through the environmental chamber may be varied. There may also be a requirement to simulate altitude within the chamber, in order to establish particular climatic conditions and impose these upon the test subjects. There are a number of uses for such chambers, including, but not limited to, medical or scientific research, materials research, the improvement of human or animal performance and assisting rehabilitation during injury recovery.

A typical example of an altitude simulator is a hypoxic generator. These are used during hypoxic therapy by individuals to obtain the benefits in physical performance and wellbeing through improved oxygen metabolism. A hypoxic generator is a device that is used to deprive the body of an adequate oxygen supply. These generators comprise an apparatus to provide reduced oxygen, or hypoxic air to a user for active or passive simulated altitude training. Hypoxic gas typically contains less than 21% oxygen concentration.

Incorporating some element of exposure to reduced oxygen atmospheres into a training program can be beneficial in terms of performance and general well-being. It has become a widely used element of training for elite athletes and is starting to become used by amateurs. Key uses might include pre-acclimatisation before travelling to high altitude climates, assisting with weight loss and for maintaining fitness levels when suffering from injury.

Typically, the aim is for the entire volume of the chamber to experience the same climatic conditions at any one time. Conditions such as temperature, humidity, oxygen level and wind chill can be varied and monitored, allowing proper evaluation and comparisons of those subjects contained within the chamber to be made and conclusions reached. Uniformity of these variable conditions throughout the chamber is required for an effective test to be conducted. However, with the existing systems that are currently used to form environmental chambers, this uniformity is very difficult to achieve. More often than not the chamber has zones that are at the required condition, but pockets that are experiencing very different conditions.

Environmental chambers typically require numerous devices to be able to create the variable conditions. These devices are often required to cool, heat, humidify, dehumidify the air flow, and vary the oxygen concentration of the air flow passing therethrough. They also require numerous sensors to monitor conditions and ensure that predetermined values are met. When mounted in an environmental chamber, all of this equipment can cause clutter within the chamber itself, and is often visually unattractive. It also inevitably created the localised climatic pockets as previously described.

An alternative approach has been to house all climate controlling devices outside of the chamber, and connecting these with the chamber through ductwork. This approach would often require an Air Handling Unit, or AHU. This air handling unit would typically comprise a cooling coil, dehumidification device, heaters and a humidifier. Air with reduced, or enhanced, oxygen content can also be introduced into the AHU, or through the ductwork, again creating localised conditions that are often different at the entrance points, exit points and other locations within the chamber.

Both of these arrangements of environmental chamber have a common disadvantage, namely a poor uniformity of conditions throughout the chamber, which makes proper scientific measurements difficult and, if used for performance, delivers different training environments to athletes exercising within the space. Those near air flow outlet points will experience a different wind chill, and therefore different temperatures and humidity, to those positioned near air flow return points, who will in turn get different conditions to those centrally located within the chamber.

There is a need to improve the uniformity of environmental conditions throughout the environmental chamber, without impacting upon the test subjects making use of the chamber. There is a need to create an effective laminar air flow throughout the chamber, whilst also providing an assembly for converting a room to become an environmental chamber. There is also an advantage to removing any clutter from such an environmental chamber in order to maximise the space and improve aesthetics.

The prior art shows a number of devices which attempt to address these needs in various ways.

WO 2016 098 598 (Fuji Medical Science Company Limited) discloses an artificial environmental control chamber for sports science use, that is configured to test the influence of a low-temperature and low-humidity environment on a body. An air blowing device blows air into the test chamber and a cylindrical air ventilation duct is disposed within an upper part of the chamber to assist with air circulation. Whilst providing additional means to improve air flow and uniformity of conditions throughout the chamber, there is still likely to be variation across the chamber. The devices also cause clutter within the test space.

Whilst the prior art appears to address the issue of improving air flow in an environmental chamber by improving air circulation within the chamber, this does not create a laminar flow of air across the chamber, and therefore uniform conditions throughout the test space. This prior art does not address the issue with clutter and machinery being housed within the test space.

BRIEF SUMMARY

Preferred embodiments of the present invention aim to provide an air conditioning assembly to provide air conditioning means within a room, thus turning the room into an environmental chamber, and ensuring uniform environmental conditions throughout the environmental chamber. In addition, embodiments of the present invention aim to provide a clutter-free, concealed solution when converting a room into an environmental chamber.

According to one aspect of the present invention, there is provided an air conditioning assembly for an environmental chamber, the air conditioning assembly comprising: a suspended ceiling for suspending below a structural ceiling of the environmental chamber to create a plenum space therebetween, said suspended ceiling being configured to cover a substantially horizontal plane of the environmental chamber whilst leaving a first perimeter gap adjacent to a wall of the environmental chamber, and a second perimeter gap adjacent to an opposing wall of the environmental chamber; a substantially vertical wall for covering a vertical plane of the plenum space; at least one fan within the plenum space, said at least one fan being configured to draw air from one side of the substantially vertical wall to the other side, and therefore configured to draw air from the environmental chamber and into the plenum space through the first perimeter gap, and to blow air from the plenum space and into the environmental chamber through the second perimeter gap; and, at least one air conditioning means in fluid communication with the at least one fan, configured to condition the air flow passing through said at least one fan; whereby, in use, the air conditioning assembly is configured to create substantially laminar air flow throughout the environmental chamber.

Preferably, the air conditioning means may comprise an altitude simulator for changing the oxygen content of the air flow.

The air conditioning means may comprise a dehumidifier for reducing the humidity of the air flow.

The air conditioning means may comprise a humidifier for increasing the humidity of the air flow.

The air conditioning means may comprise a heater to increase the temperature of the air flow.

The air conditioning means may comprise a cooling radiator to reduce the temperature of the air flow.

Preferably, the air conditioning assembly comprises at least one sensor.

The at least one sensor may be an oxygen sensor.

The at least one sensor may be a temperature sensor.

The at least one sensor may be a humidity sensor.

The at least one sensor may be a carbon dioxide sensor.

Preferably, the air conditioning assembly may comprise at least one control means operatively connected to the at least one fan and the at least one air conditioning means.

The air conditioning assembly may comprise at least one control means operatively connected to the sensors.

The vertical wall may comprise a cooling coil.

The at least one fan may incorporate a plurality of vanes for directing the air flow to the full width of the environmental chamber.

The vertical wall may comprise a partitioning board.

The vertical wall may comprise sealing means for sealing the vertical wall within the plenum space, and at least one aperture corresponding with an inlet of the at least one fan.

The air conditioning means may be mounted external to the environmental chamber, and in fluid communication with the plenum space through ducting.

The air conditioning assembly may comprise flow directing means.

Preferably, the flow directing means may comprise curved ceiling coving.

Alternatively, the flow directing means comprises planar, inclined coving.

According to a further aspect of the present invention, the environmental chamber may incorporate the air conditioning assembly as hereinbefore described.

The walls and structural ceiling may comprise a prefabricated shell.

According to yet a further aspect of the present invention, there is provided a method of installing the air conditioning assembly in a room to form an environmental chamber, comprising the steps of: installing a suspended ceiling below a structural ceiling of the room to create a plenum space therebetween, said suspended ceiling being configured to cover a substantially horizontal plane of the environmental chamber whilst leaving a first perimeter gap adjacent to a wall of the environmental chamber, and a second perimeter gap adjacent to an opposing wall of the environmental chamber; installing a substantially vertical wall to cover a vertical plane of the plenum space; installing at least one fan within the substantially vertical wall, said at least one fan being configured to draw air from the environmental chamber and into the plenum space through the first perimeter gap, and to blow air from the plenum space and into the environmental chamber through the second perimeter gap; and, installing at least one air conditioning means in fluid communication with the at least one fan, configured to condition the air flow passing through said at least one fan; whereby, in use, the air conditioning assembly is configured to create substantially laminar air flow throughout the environmental chamber.

BRIEF DESCRIPTION OF THE DRAWINGS

For a better understanding of the invention and to show how embodiments of the same may be carried into effect, reference will now be made, by way of example, to the accompanying diagrammatic drawings, in which.

In the figures like references denote like or corresponding parts.

DETAILED DESCRIPTION OF EXAMPLE EMBODIMENTS

Figure 1:
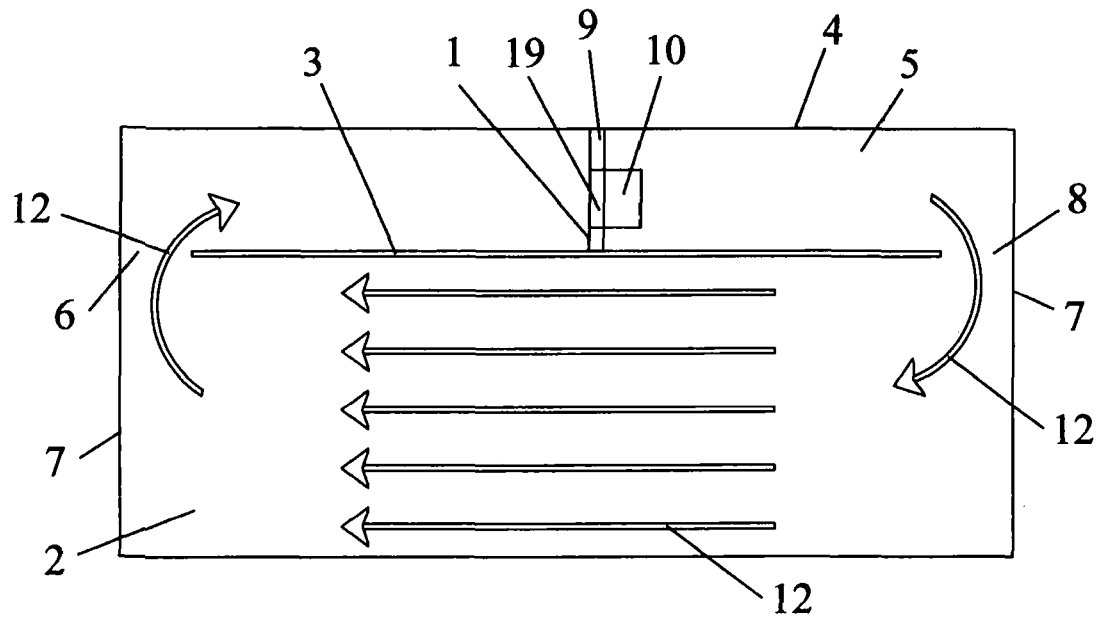
FIG. 1 shows one embodiment of air conditioning assembly within a room to create an environmental chamber, showing a plenum space between structural ceiling and suspended ceiling, and the laminar air flow created within the chamber by the air conditioning assembly.
Figure 2:
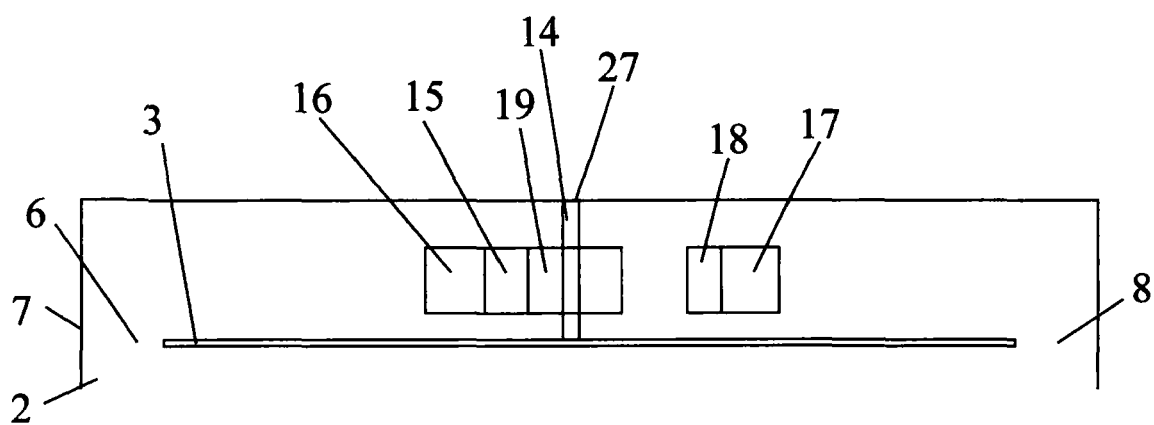
FIG. 2 shows the air conditioning assembly of FIG. 1 operatively connected to a plurality of air conditioning means.

FIG. 1 shows the air conditioning assembly 1 that is used to create the environmental chamber 2. The air conditioning assembly 1 is configured to be mounted behind a suspended ceiling 3, that leaves a plenum space 5 between the suspended ceiling 3 and the structural ceiling 4 of the room. The plenum space 5 is an air handling space to facilitate air circulation, heating and air conditioning systems within buildings. A suspended ceiling 3 is also known as a dropped ceiling or false ceiling. The room may comprise an existing room within a building, or may be purpose built for use as an environmental chamber 2, and therefore may comprise a prefabricated shell, not shown.

The suspended ceiling 3 spans the entire width of the room, leaving no gaps between the edge of the suspended ceiling 3 and the walls 7. The suspended ceiling 3 is configured to leave a first perimeter gap 6 and a second perimeter gap 8 between the suspended ceiling 3 and the walls 7 of the environmental chamber 2. The suspended ceiling 3 therefore spans the length of the environmental chamber 2, however leaving a first perimeter gap 6 and second perimeter gap 8 at opposing walls 7. The suspended ceiling 3 may of course span the full length of the environmental chamber 2, and the first perimeter gap 6 and second perimeter gap 8 may be where the suspended ceiling 3 meets the walls 7 of the environmental chamber 2, across the width of the environmental chamber 2, assembly 1 mounted within the plenum space 5.

The first perimeter gap 6 is configured to provide an effective air outlet from the test space of the environmental chamber 2 into the plenum space 5, this first perimeter gap 6 stretching along substantially the entire edge of the suspended ceiling 3. Likewise the second perimeter gap 8 is configured to provide an effective air inlet from the plenum space 5 into the test space of the environmental chamber 2, with again this second perimeter gap 8 stretching along substantially the entire opposite edge of the suspended ceiling 3. Air flow 12 can therefore travel between plenum space 5 and test space in a relatively unobstructed manner.

Within the plenum space 5 and mounted between suspended ceiling 3 and structural ceiling 4 is a substantially vertical wall 9, said vertical wall 9 being sealed by sealing means 14 between both suspended ceiling 3 and structural ceiling 4, and adjoining walls 7. The vertical wall 9 is configured to support a plurality of fans 10, mounted to it, or placed alongside, with corresponding apertures within the vertical wall 9 to allow air flow 12 to be drawn through the vertical wall 9 and into the plurality of fans 10. The plurality of fans 10 provide flow control means for varying the rate of flow of the air flow 12 flowing through the plenum space 5 and therefore the test space below. The plurality of fans 10 draw air from the test space up through the first perimeter gap 6 and into the plenum space 5, and blow air through the plenum space 6, down through the second perimeter gap 8 and into the test space below. The fans 10 are configured to provide as laminar flow as possible throughout the test space below. The fans 10 may be provided with vanes 13, to assist with spreading the air flow 12 across the full expanse of environmental chamber 2. The plurality of fans 10 may also be spaced across the full width of the environmental chamber 2 again to create as uniform air flow 12 as possible to be blown into the test space. The suspended ceiling 3 conceals the air conditioning assembly 1 in its most basic form, thus leaving the room aesthetically pleasing to the eye and clutter free.

An air conditioning means 11 is in fluid communication with the plurality of fans 10, such that the air conditioning means 11 can alter the air flow 12 in a required way. The air conditioning means 11 is configured according to the requirements of the environmental chamber 2. The air conditioning means 11 may be configured to be within the plenum space S before the vertical wall 9, or alternatively the air conditioning means 11 may be configured to be after the vertical wall 9, or in a further embodiment, some air conditioning means 11 may be configured before the vertical wall 9 and some may be configured after the vertical wall 9, depending on the requirements of the test space and the function of the component of air conditioning means 11.

The air conditioning means 11 may comprise one or more of the following items: an altitude simulator 15, a dehumidifier 16, a humidifier 17, a heater 18, a cooling radiator 19. The air conditioning means 11 may comprise any one of this list of items, or more than one of each of the items, or any combination of this list of items, again as singles or multiples depending on the specific requirements of the environmental chamber 2. The air conditioning means 11 may be provided as a modular arrangement of component items that are all configured to act upon the same air flow 12. The air conditioning means 11, with or without the plurality of fans 10, may be contained within a housing, not shown. Or the items may be mounted individually, or in various arrangements, to a framework of the suspended ceiling 3, not shown. In yet a further embodiment, the air conditioning means 11, in any required configuration of units, is external to the environmental chamber 2, and in fluid communication with the plenum space 5 through ducting.

The altitude simulator 15 is configured to provide a hypoxic or hyperoxic air flow 12 to the test space. The altitude simulator provides a variable injection of oxygen to the air flow 12 for reducing or increasing the simulated altitude experienced by test subjects within the test space.

The air conditioning means 11 provides environmental control devices to the test space. These environmental control devices simulate altitude, provide relative humidity and variable temperature of air flow 12 through the test space. The dehumidifier 16, such as an evaporator unit or chilled water fan coil, is configured to remove humidity from the air flow 12. The dehumidifier 16 may form part of a cooling unit, that also provides means to reduce the temperature of the air flow 12. The humidifier 17 may comprise a steam injector, or other humidifying device. The humidifier 17 is configured to provide humidity to the air flow 12. The heater 18 may comprise one or more heating elements, are configured to increase the temperature of the air flow 12. The cooling radiator 19 is configured to reduce the temperature of the air flow 12.

Figure 3:
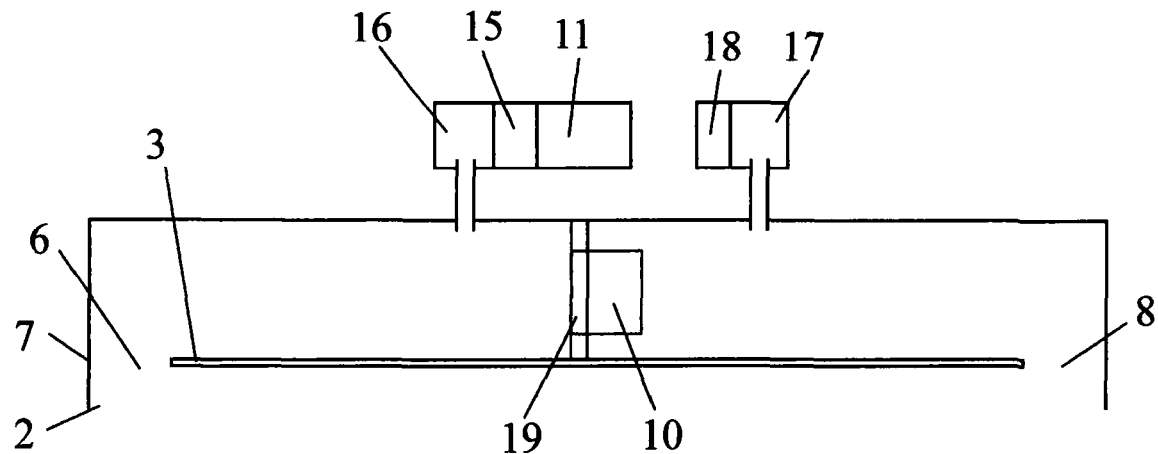
FIG. 3 shows a further arrangement of air conditioning means, with a plurality of air conditioning means configured external to the environmental chamber, and in fluid communication with the plenum space through ducting.

FIG. 3 shows a further arrangement of air conditioning assembly 1 where the air conditioning means 11, or the required units that make up the air conditioning means 11 specific to a required air flow, are configured external to the environmental chamber 2, and in fluid communication with the plenum space 5 of the environmental chamber 2 through ducting or similar means. The ducting directs the air flow 12 away from the plenum space 5, through the air conditioning means 11, and back into the plenum space 5 having been conditioned according to requirements.

Figure 4:
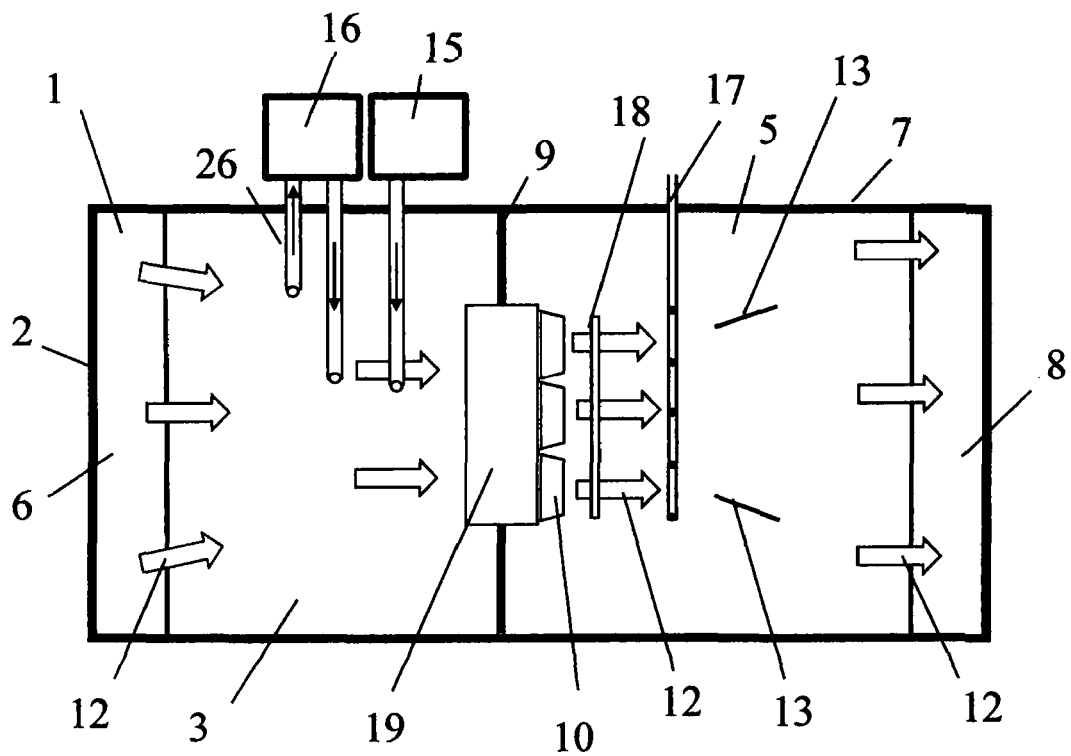
FIG. 4 shows the air conditioning assembly of FIG. 1 in plan view, showing one arrangement of plurality of fans.

FIG. 4 shows a plan view of one arrangement of air conditioning assembly 1 showing three fans 10 in fluid communication with the cooling radiator 19, said fans 10 being arranged to ensure an even spread of air flow 12 across the full width of the plenum space 5. Air flow 5 is drawn from the test space through the first perimeter gap 6 and into the plenum space 5. This air flow 5 is drawn through ducting 26 to the dehumidifier 16, dehumidified, then returned to the plenum space 5. If required, the altitude simulator 15 supplies supplementary oxygen or removes oxygen from the air flow 12 within the plenum space 5. The air is flow 5 is drawn through the cooling radiator 19 by the fans 10. The fans 10 blow the air through the heater 18, configured to heat the air flow 12 if required. The humidifier 17, such as a steam injection lance, supplies humidity or moisture to the air flow 12, if required. The air flow 12 is blown through the plenum space 5 and down through the second perimeter gap 8, returning to the test space as a substantially laminar air flow 12 that spreads the full width of the test space. An arrangement of vanes 13 may be provided to help to spread the air flow 12 throughout the width of the plenum space 5, and therefore ensuring the air flow 12 is sufficiently spread throughout the full width of the test space. This laminar air flow 12 is supplied to the test space at the required temperature, humidity and oxygen level for the test subjects.

Figure 5:
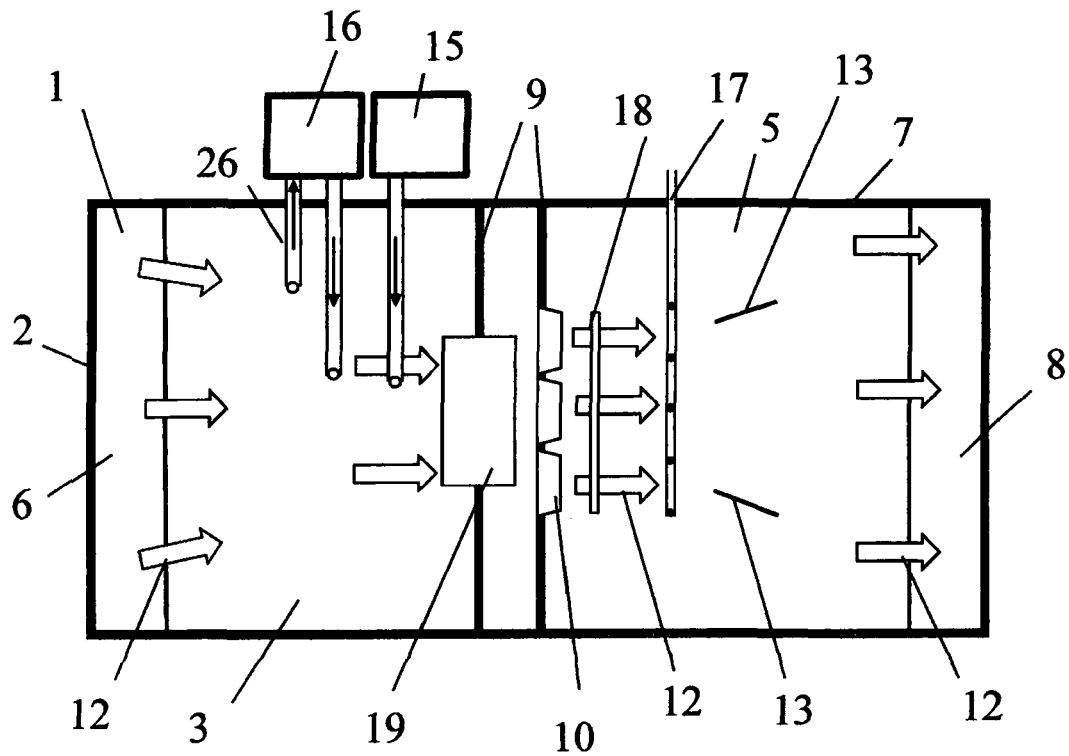
FIG. 5 shows the air conditioning assembly of FIG. 1 in plan view, showing an alternative arrangement of plurality of fans.

The plan view of FIG. 5 shows an additional vertical wall 9 within the plenum space 5, to which the plurality of fans 10 are mounted. This arrangement creates a further air space within the plenum space 5 between the cooling radiator 19 and the vertical wall 9 that supports this cooling radiator 19, and the additional vertical wall 9 that supports the bank of fans 10.

All of these air conditioning devices that make up the air conditioning means 11 are controlled by a control means 20. The control means 20 provides a way of controlling each of the devices set up within an environmental chamber 2 independently of each other where necessary, to create a required air flow 12 through the test space.

Figure 6:
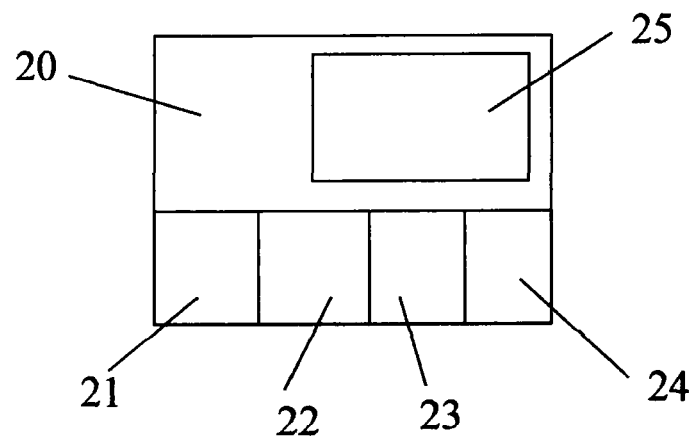
FIG. 6 shows one embodiment of control means housing a plurality of sensors.

FIG. 6 shows one embodiment of control means 20, that wirelessly, or through hard wiring systems, provides the means of controlling the air conditioning means 11 within the plenum space 5. The control means 20 may be mounted to the walls 7 within the test space, may be outside of the environmental chamber, or may be within a portable device, not shown.

The control means 20 may also comprise a plurality of sensors, and therefore be mounted within a suitable location within the test space to take a valid reading of the air flow 12. The sensors may include any one or more of the following: oxygen sensor 21, temperature sensor 22, relative humidity sensor 23, carbon dioxide sensor 24 for sensing and storing or transmitting data for each of these. The control means 20 may incorporate a control panel 25 with button control means or touchscreen facility. A person conducting a test within the test space can therefore take a reading for any one of these, and control the air conditioning means 11 within the air conditioning assembly 1 accordingly.

The passage of the air flow 12 within the plenum space 5, between air conditioning means 11, may be provided with ducting, not shown.

The invention claimed is:

1. An air conditioning assembly for an environmental chamber, the air conditioning assembly comprising:
   a suspended ceiling for suspending below a structural ceiling of the environmental chamber to create a plenum space therebetween, said suspended ceiling being configured to cover a substantially horizontal plane of the environmental chamber while leaving a first perimeter gap adjacent to a first wall of the environmental chamber, and a second perimeter gap adjacent to an opposing second wall of the environmental chamber;
   a substantially vertical wall for covering a vertical plane of the plenum space, the substantially vertical wall being disposed between the first and second walls;
   at least one fan within the plenum space, said at least one fan being configured to draw air from one side of the substantially vertical wall to the other side, and therefore configured to draw air from the environmental chamber and into the plenum space through the first perimeter gap, and to blow air from the plenum space and into the environmental chamber through the second perimeter gap; and
   at least one air conditioner in fluid communication with the at least one fan, configured to condition the air flow passing through said at least one fan;
   wherein the at least one air conditioner comprises an altitude simulator for changing the oxygen content of the air flow, and the first perimeter gap and the second perimeter gap are configured such that they span along substantially the entire edge of the suspended ceiling such that, in use, the air conditioning assembly is configured to create substantially laminar air flow throughout the environmental chamber.

2. An air conditioning assembly according to claim 1, wherein the air conditioner comprises a dehumidifier for reducing the humidity of the air flow.

3. An air conditioning assembly according to claim 1, wherein the air conditioner comprises a humidifier for increasing the humidity of the air flow.

4. An air conditioning assembly according to claim 1, wherein the air conditioner comprises a heater to increase the temperature of the air flow.

5. An air conditioning assembly according to claim 1, wherein the air conditioner comprises a cooling radiator to reduce the temperature of the air flow.

6. An air conditioning assembly according to claim 1, wherein the air conditioning assembly comprises at least one sensor.

7. An air conditioning assembly according to claim 6, wherein the at least one sensor is selected from at least one of an oxygen sensor, temperature sensor, humidity sensor, and carbon dioxide sensor.

8. An air conditioning assembly according to claim 6, wherein the air conditioning assembly comprises at least one controller operatively connected to the at least one sensor.

9. An air conditioning assembly according to claim 1, wherein the air conditioning assembly comprises at least one controller operatively connected to the at least one fan and the at least one air conditioner.

10. An air conditioning assembly according to claim 1, wherein the vertical wall comprises a cooling coil.

11. An air conditioning assembly according to claim 1, wherein the at least one fan incorporates a plurality of vanes for directing the air flow to the full width of the environmental chamber.

12. An air conditioning assembly according to claim 1, wherein the vertical wall comprises a partitioning board.

13. An air conditioning assembly according to claim 1, wherein the vertical wall comprises a seal for sealing the vertical wall within the plenum space, and at least one aperture corresponding with an inlet of the at least one fan.

14. An air conditioning assembly according to claim 1, wherein the air conditioner is mounted external to the environmental chamber, and in fluid communication with the plenum space through ducting.

15. An air conditioning assembly according to claim 1, wherein the air conditioning assembly comprises a flow director.

16. An air conditioning assembly according to claim 15, wherein the flow director comprises curved ceiling coving.

17. An air conditioning assembly according to claim 15, wherein the flow director comprises planar, inclined coving.

18. An environmental chamber incorporating the air conditioning assembly of claim 1.

19. An environmental chamber according to claim 18, wherein the walls and structural ceiling comprise a prefabricated shell.

20. A method of installing the air conditioning assembly of claim 1 in a room to form an environmental chamber, comprising the steps of:
- installing a suspended ceiling below a structural ceiling of the room to create a plenum space therebetween, said suspended ceiling being configured to cover a substantially horizontal plane of the environmental chamber while leaving a first perimeter gap adjacent to a wall of the environmental chamber, and a second perimeter gap adjacent to an opposing wall of the environmental chamber whereby the first perimeter gap and the second perimeter gap span substantially the entire edge of the suspended ceiling;
- installing a substantially vertical wall to cover a vertical plane of the plenum space;
- installing at least one fan within the substantially vertical wall, said at least one fan being configured to draw air from the environmental chamber and into the plenum space through the first perimeter gap, and to blow air from the plenum space and into the environmental chamber through the second perimeter gap; and,
- installing at least one air conditioner in fluid communication with the at least one fan, configured to condition the air flow passing through said at least one fan;
- wherein at least one air conditioner comprises an altitude simulator and, in use, the air conditioning assembly is configured to create substantially laminar air flow throughout the environmental chamber.

\* \* \* \* \*